United States Patent [19]

Defay et al.

[11] Patent Number: 4,974,255
[45] Date of Patent: Nov. 27, 1990

[54] SYSTEM FOR REMOTELY MONITORING A SINGLE- OR MULTI-FUNCTION INSTALLATION BY TELEPHONE

[75] Inventors: Christian Defay, Strasbourg; Gilbert Guyot, Mutzig, both of France

[73] Assignee: Societe Anonyme dite : Telic Alcatel, Paris, France

[21] Appl. No.: 324,061

[22] Filed: Mar. 16, 1989

[30] Foreign Application Priority Data

Mar. 16, 1988 [FR] France .................................. 88 03387

[51] Int. Cl.$^5$ ........................................... H04M 11/00
[52] U.S. Cl. ....................................... 379/106; 379/96; 379/102; 379/104; 379/105
[58] Field of Search .................. 379/96, 102, 104, 105, 379/106

[56] References Cited

U.S. PATENT DOCUMENTS

| | | | |
|---|---|---|---|
| 4,598,286 | 7/1986 | Miller et al. | 379/105 X |
| 4,766,548 | 8/1988 | Cedrone et al. | 379/102 X |
| 4,829,560 | 5/1989 | Evanyk et al. | 379/106 |
| 4,847,894 | 7/1989 | Chanvin et al. | 379/104 |

Primary Examiner—Jin F. Ng
Assistant Examiner—Stella Woo
Attorney, Agent, or Firm—Sughrue, Mion, Zinn, Macpeak & Seas

[57] ABSTRACT

A remote monitoring system for remotely monitoring, by telephone, at least one apparatus of an installation (1), acting through a telephone network (2) having lines to which the installation and at least one distant terminal device (3) are connected for remote monitoring purposes, the system being characterized in that it comprises, local to the installation, a premises controller (4) organized about a microprocessor control circuit (18) and connected firstly to units (23, 24 25) of the apparatus to be monitored in the installation, and secondly to a directory terminal (5) of a type suitable for automatically detecting and dialing telephone calls (12, 13) in order to be put into communication with the terminal device (3) through the telephone network, said terminal device being compatible with the selected directory terminal (5) so as to enable them to be put into communication with each other manually and/or automatically from either end via the telephone lines (L1, L2) respectively connecting the terminal device (3) and the directory terminal (5) to the telephone network.

11 Claims, 5 Drawing Sheets

SYSTEM FOR REMOTELY MONITORING A SINGLE- OR MULTI-FUNCTION INSTALLATION BY TELEPHONE

BACKGROUND OF THE INVENTION

The invention relates to a remote monitoring system for remotely monitoring a single- or multi-function installation of moderate size by telephone, e.g. for use in a home or a shop and other premises that may be attached thereto, or for use in a workshop or a small establishment.

Since progress in telephone networks now makes it possible to transmit both speech signals and data signals easily, users are looking for ways of taking advantage of the possibilities of interconnecting telephone terminals connected to the same network for the purpose of remotely monitoring the operations of installations by telephone without geographic constraints.

"Remote monitoring", sometimes also called "remote action", should be considered herein as covering a wide range of applications requiring one-way or two-way transmission, usually of short messages that are generally produced on a sporadic basis.

This range of applications includes, in particular, remote control, remote operation, and remote surveillance.

An apparatus in an installation as mentioned above may be remotely controlled over the switched telephone network by means of a specialized transmitter which is connected to the telephone network either via a conventional telephone set or directly as a telephone set. The transmitter is suitable for generating special remote control signalling which is normally different from the signalling used for operating the telephone network. The special signalling is received by a specialized receiver whose function is to control the apparatus accordingly, and for this purpose the receiver is connected to the telephone network in comparable manner to the transmitter. Naturally, in order to be able to transmit special remote control signalling, a telephone connection must be set up between the specialized transmitter and receiver over the telephone network using the procedure appropriate for the network. Facilities for two-way transmission are often provided.

Remote control systems of this type are generally expensive, in particular because they use special equipment which is often associated with a single specific function.

SUMMARY OF THE INVENTION

Consequently, the present invention proposes a remote monitoring system for remotely monitoring, by telephone, at least one apparatus in a single- or multi-function installation, the system minimizing the use of special equipment and taking advantage of the possibilities provided by standard terminals. Said system acts via a telephone network having lines connected both to the installation and to at least one distant terminal device for remote monitoring purposes.

According to a characteristic of the invention, this remote monitoring system comprises, local to the installation, a premises controller organized about a microprocessor control logic circuit and connected firstly to units of the apparatus to be monitored in the installation, and secondly to a directory terminal of the type including both an automatic telephone call detector and an automatic telephone call dialer for putting it into communication with the terminal device via the telephone network, said terminal device being compatible with the selected directory terminal so as to enable them to be put into communication with each other manually and/or automatically from either end via the telephone lines respectively connecting the terminal device and the directory terminal to the telephone network.

BRIEF DESCRIPTION OF THE DRAWINGS

The invention, its characteristics, and its advantages are described below with reference to the following figures.

DETAILED DESCRIPTION OF THE INVENTION

Figure 1:
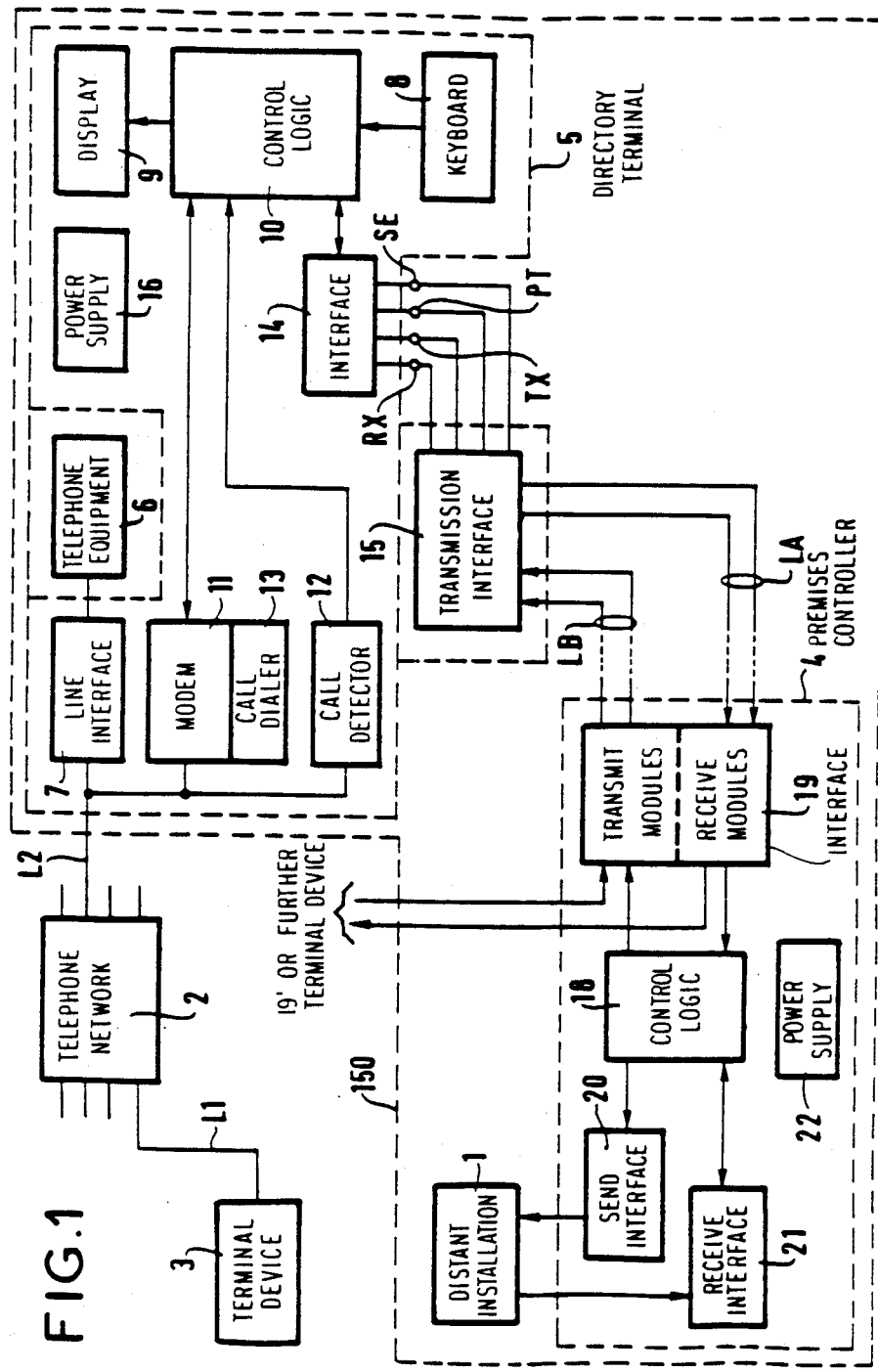
FIG. 1 is a block diagram of a remote monitoring system of the invention.

The remote monitoring system shown in FIG. 1 is intended to provide individual remote control of at least one distant installation 1 via a telephone network 2 from at least one terminal device 3 suitable for interchanging data at least with said distant installation 1 by telephone after a communications path has been set up through the telephone network.

As mentioned above, remote monitoring can cover a very wide range of applications in the context of a very wide range of installations 1. It must enable data to be transmitted on a one-way or a two-way basis and on the initiative of the terminal device 3 and/or of the installation 1. The device 3 and the installation 1 may be in arbitrary geographical locations so long as each of them can have access to a conventional telephone line L1 or L2 as provided for connecting an ordinary telephone set to the telephone network 2.

The telephone network 2 will normally be constituted by the publicly accessible telephone network serving the premises at which the installation 1 is situated and at which the device 3 is situated at a distance therefrom.

The device 3 of the invention may be constituted, for example, by a terminal of the type referred to as a "directory terminal" as mentioned in issue 1 of the journal "Commutation et Transmission", published in Mar. 1984, in an article entitled "Terminaux professionnels d'information à usage personnel" (Professional data terminals for personal use). The structure of such a directory terminal is defined below, and it is represented as being connected to a telephone line L1.

The device 3 of the invention may also be a computer, in particular a personal computer, provided with means enabling it to be connected, like a telephone set, to a telephone line L1 and enabling it to emulate a directory terminal. It would also be constituted by a server of the type suitable for interactive connection with directory terminals.

The distant installation 1 is connected to a telephone line L2 for remote monitoring purposes. This connection is performed via a premises controller 4 connected in series with a second directory terminal 5 which is connected to the wires of telephone line L2.

The device 3 and the directory terminal 5 are naturally compatible with each other and they may be identical. Only the terminal 5 is described in detail below.

This directory terminal 5 is intended to be associated in conventional manner with a telephone equipment 6 which, depending on circumstances, may either be a conventional external telephone set, or else it may be the equivalent thereof incorporated within the terminal itself.

This telephone equipment 6 is connected via a line interface 7 to the connection terminals provided on the directory terminal 5 for connection to a telephone line such as L2.

In conventional manner, the directory terminal 5 has an alphanumeric keyboard 8 for entering data and a display device 9 such as a screen for displaying data as transmitted in the form of digital data over the telephone line L2 or as keyed-in from the keyboard 8. The keyboard 8 and the display device 9 are controlled by a controlling logic circuit 10 which is conventionally organized about a microprocessor and its set of memories. The control circuit 10 interchanges data in digital form between the keyboard, the display device, and the telephone line. For this purpose, it is connected to the line via a modem 11 which is in turn connected to the directory terminal's telephone line connection terminals in parallel with the line interface 7 and with a telephone call detector 12. The telephone call detector 12 is suitable for recognizing calling signals, i.e. "ringing", as transmitted over the line L2 from the telephone network, and for informing the control circuit 10 for possible action in the event that there is no response via the telephone equipment 6. Naturally, the most usual type of response to be expected from the telephone equipment 6 is that of a user taking the handset off-hook after hearing the audible signals produced by the telephone equipment on receiving ringing current.

A call dialer 13 enables users of the directory terminal 5 to produce the dialing signals required for setting up a call over the telephone network 2, in particular to another terminal device such as 3. The call dialer 13 is under the control of the control circuit 10, and in this case it is combined with the modem 11.

The directory terminal 5 also has an interface 14 for a computer connector for transmitting data as received over the telephone line L2 or as produced by the keyboard and/or the control circuit to peripheral equipment (not shown). This connector also enables the above-mentioned peripheral equipment to send data to the control circuit, to the display device 9, and/or to the distant terminal device 3, over the line L2.

In accordance with the invention, a "medium-distance" two-way transmission interface is connected in parallel with the following connection terminal wires of the computer connector: RX, TX, PT, and SE. This makes it possible to interchange data in digital form over two medium-distance links LA and LB, each of which is a one-way two-wire link, with said links being used in opposite directions. Depending on the type of directory terminal, the medium-distance transmission interface 15 is either integrated in the directory terminal, in which case it is powered thereby, or else it is housed in an external housing which is plugged into the computer connector.

An overall power supply 16 for the directory terminal is designed to be connected on a permanent basis to receive power from an A.C. mains network. It is suitable for providing both the electrical energy required for maintaining the terminal on stand-by with its display switched off during prolonged periods of no data interchange, and also the energy required for full use of the terminal while data is being interchanged.

In accordance with the invention, the installation 1 which is to be remotely monitored is associated with a "premises controller" equipment 4 which is connected to the other ends of the one-way links LA and LB from the medium-distance transmission interface 15 of the directory terminal 5.

The premises controller 4 is organized about a control logic circuit 18 of similar structure to the control logic circuit 10, i.e. it comprises a microcontroller type of processor together with memories. A "controller" transmission interface 19 is complementary to the medium-distance transmission interface 15 and enables data to be interchanged between the directory terminal 5 and the control circuit 18, and it may optionally also provide a two-way link with a distant transmission interface 19'.

The control circuit 18 acts on a send interface 20 for sending data and in particular commands to various units (not shown here) of the installation 1.

The control circuit 18 is also connected to a receive interface 21 for receiving data, in particular readings, from the units of the installation 1.

A power supply 22 connected to the A.C. mains provides electrical energy in appropriate form and in conventional manner to the components of the premises controller. In this case it is provided with a temporary back-up and is capable of safeguarding a portion of the memory in the control circuit.

In the context of an example where the installation 1 relates to a home, the directory terminal 5 will normally be placed in one of the living rooms, e.g. a sitting room or an office, whereas the premises controller 4 will normally be located close to where data is collected and/or where data is used for control purposes, e.g. in the vicinity of the main electricity distribution point in the home, and thus as a general rule at a distance from the directory terminal 5. Putting the premises controller and the electricity distribution point close together facilitates electrical remote control of the units in the installation.

Figure 2:
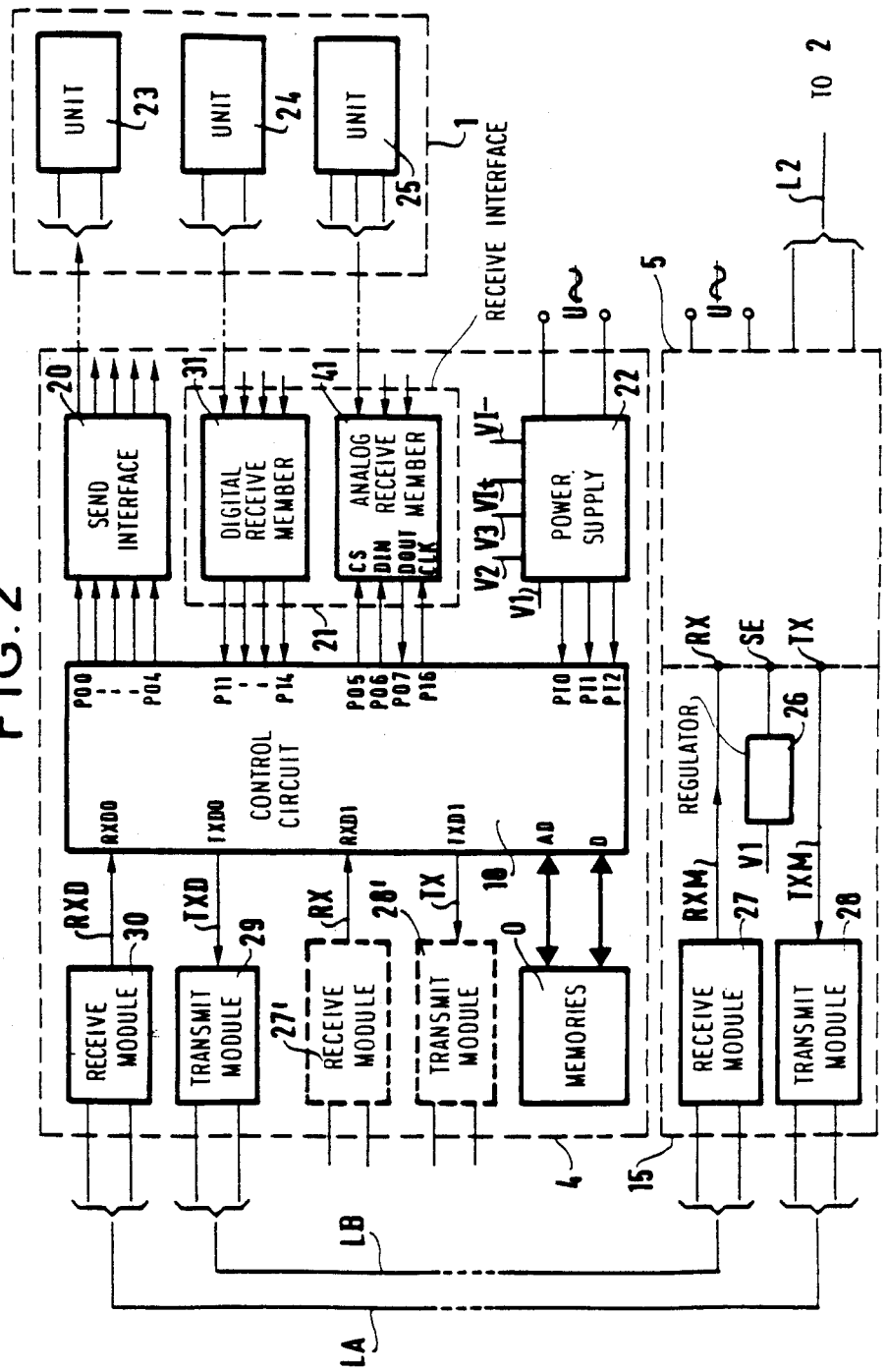
FIG. 2 is a block diagram of the on-site device in a remote monitoring system of the invention.

An example of an on-site device 150 in a system for remotely monitoring an installation is shown in FIG. 2, and it associates a directory terminal 5 and its medium-distance transmission interface 15 with a premises controller 4 serving units 23, 24, and 25 in installation 1.

The directory terminal 5 is conventionally connected firstly to an A.C. supply U for power supply purposes and secondly to the two wires of a telephone line L2 connecting it to the telephone network 2. The transmission interface 15 of the directory terminal is connected to the transmit wire TX and to the receive wire RX of the computer connector, and it includes a regulator 26 which provides it with energy taken from the external power supply wire SE of said computer connector. Two modules, namely a receive module 27 and a transmit module 28, constitute the essential components of the transmission interface of the directory terminal, and they are respectively connected to the TX wire and the RX wire of the computer connector, with each of them being connected to a complementary module 29 or 30 in the transmission interface 19 of the premises controller 4, via respective ones of the links LA and LB.

Figure 4:
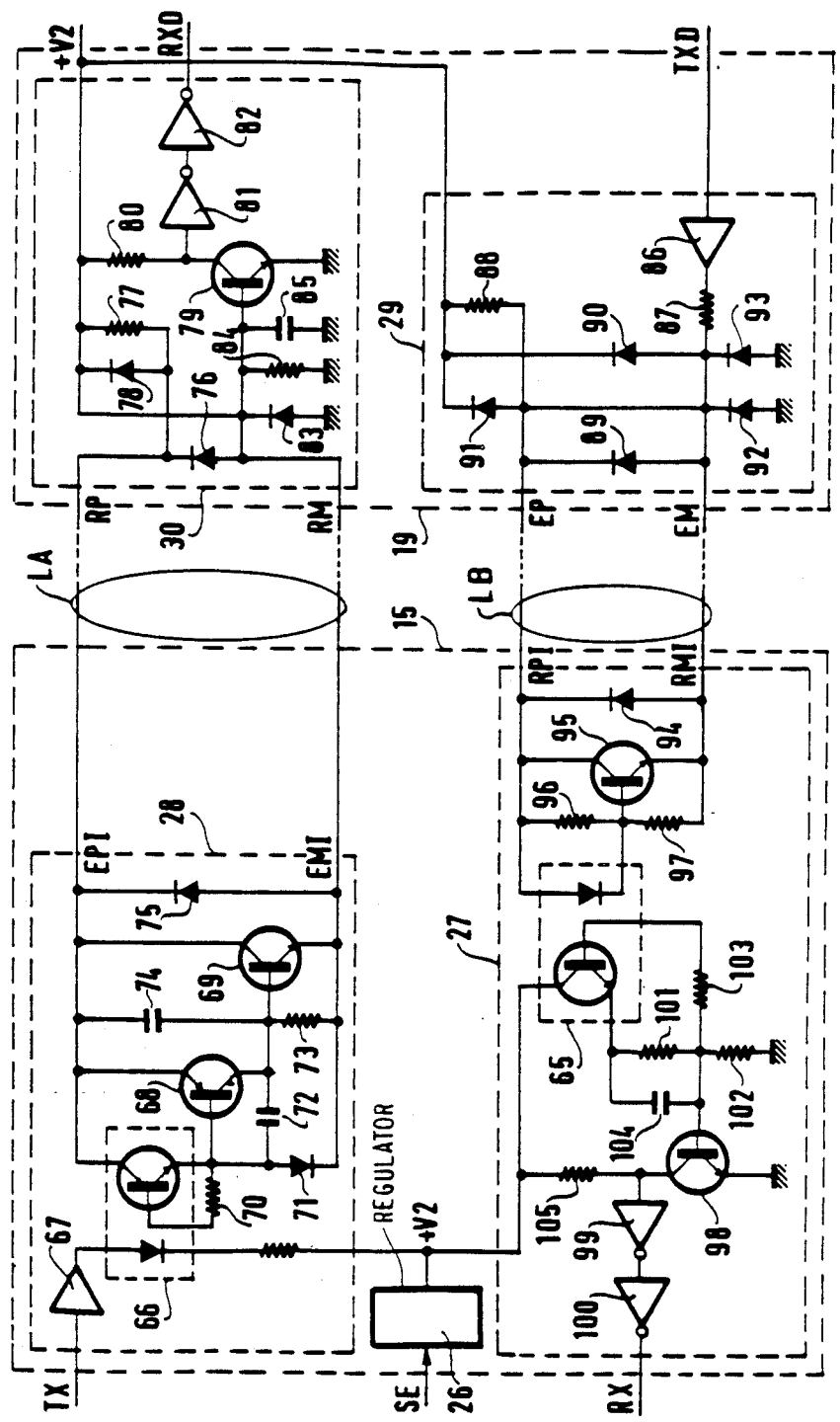
FIG. 4 shows an embodiment of the transmission modules for the on-site device of a remote monitoring system of the invention.

Specific examples of the modules 27, 28, 29, and 30 are described in greater detail below with reference to FIG. 4.

The control circuit 18 is organized, for example, about a conventional microcontroller such as an NEC model V25 or 70320. The transmit module 29 and the receive module 30 are respectively connected, for example, to pins TXD0 and RXD0 be longing to one of the two serial two-way links provided in this microcontroller.

A set of memories O is conventionally associated with the control circuit 18 and it conventionally comprises a read only memory (ROM) together with working memory (RAM) including at least a portion which is backed up by a battery or rechargeable battery for very long periods of time, said portion receiving, in particular, data relating to the real configuration of the premises controller in which it is included. The set of memories O communicates in conventional manner with the microcontroller of the control circuit via an address bus and a data bus.

The control circuit 18 sends data to the units of the installation and receives data from said units via a plurality of input/output (I/O) ports.

Data is sent to the units or to the directory terminal 5 on the initiative of the control circuit as a function of its operating program contained in its memories. Data requests may be initiated by the terminal device 3 and conveyed via the telephone network 2 and the directory terminal 5, after which they are taken into account by the control circuit 18 at the premises controller, and it is this control circuit which controls the operations that result therefrom.

In the implementation described, the control circuit 18 controls the units 23 by means of binary type signals as produced by an instruction-sending interface 20. For this purpose, the interface 20 is connected firstly to output ports, in this case P00 to P04, of the control circuit 18 and secondly to control inputs of the units 23, e.g. relays, with only one unit being shown in this case.

Figure 3:
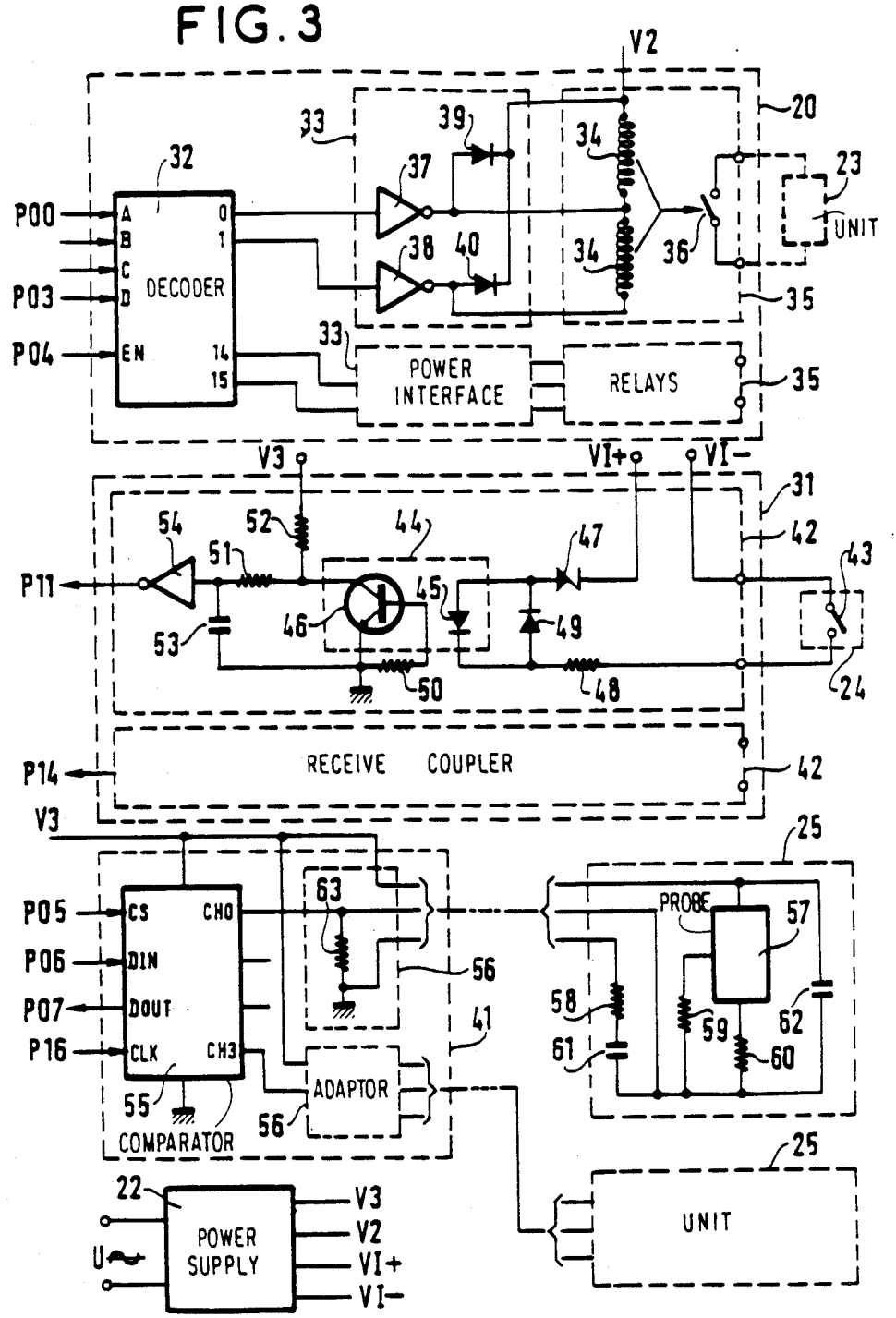
FIG. 3 shows an embodiment of the interface modules for an on-site device.

An example of a send interface 20 is shown in FIG. 3, it includes a four-input and sixteen-output decoder 32 which is activated by port P04 of the control circuit 18 and which is addressed by the ports P00 to P03 of the same control circuit. The outputs of the decoder 32 activated in pairs are connected via power interfaces 33 to the terminals of the control windings 34 of bistable relays 35 each of which has at least one contact 36 acting on the power supply to the units 23, which may be contacts for switching on a motor, an electrically controlled valve, etc. . . .

In the conventional circuit shown in FIG. 3, a power interface 33 comprises, for example, two inverting amplifiers 37 and 38, and two diodes 39 and 40 for controlling the two series-connected windings of a relay 35 powered by a voltage V2 supplied by the power supply 22 of the premises controller 4 (see FIG. 3).

As already mentioned, the control circuit 18 is also connected and programmed to receive status information of analog and/or of on/off type as provided by units 24 and 25 in the installation 1. e.g. analog sensors, or threshold detectors. To this end, it is connected to a peripheral data receive interface 21 which is constituted by a digital receive member 31 and by an analog receive member 41 shown respectively connected to a unit 24 and a unit 25 in FIG. 2.

The digital receive member 31 shown in FIGS. 2 and 3 is connected to four input ports P11 to P14 of the control circuit 18, and it serves four sensor units 24 each of which is connected thereto via a receive coupler 42. Each sensor unit 24 provides on/off type information, e.g. by means of a contact 43 through which current provided by the power supply 22 flows via terminals VI+ and VI− whenever the contact 43 is closed. The receive coupler 42 is provided, for example, with a photocoupler 44 whose light-emitting element 45 is connected in series with the contact 43 in such a manner that its light-receiving element 46 acts accordingly on the corresponding input port, e.g. P11 in FIG. 3.

A zener diode 47 and a resistor 48 are connected in series with the light-emitting diode (LED) which constitutes the light-emitting element 44, and a diode 49 connected in parallel with said LED serves to protect it and the upstream circuit in the event of a voltage and/or a current surge from the installation 1.

The transistor which constitutes the light-receiving element 46 of the photocoupler is itself connected between ground and terminal V3 of the power supply 22 by means of a conventional circuit using three resistors 50, 51, and 52, together with a capacitor 53, and it is connected to the input of an inverting amplifier 54 whose output is connected to port P11.

The analog receive member 41 is intended to serve analog sensors 25, e.g. a temperature sensor or a humidity sensor, as used for remotely controlling the heating of an installation.

This member is connected to three output ports P05, P06, and P16 and to one input port P07 of the control circuit 18, and it comprises a multi-input comparator 55, such as a National Semiconductor model ADC 0854 circuit. This circuit compares a sample of a signal provided by one or other of four sensors 25 via a corresponding number of adaptors 56 with a corresponding reference provided by the control logic via port P06 acting on serial data input DIN of the comparator.

The comparator compares each sample at a rate set by a clock signal provided by the control circuit 18 on input CLK and it delivers an account of the comparison it has performed via its output DOUT.

An example of a temperature sensor is shown in FIG. 3. In this case, it comprises a conventional probe 57 constituted by a National Semiconductor LM35 circuit associated in a conventional circuit with three resistors 58, 59, and 60 and with two capacitors 61, and 62. The probe is placed in an appropriate location and it is connected by a screened twisted pair to the terminals of a resistor 63 in an adaptor 56. The voltage which appears across the terminals of this resistor (one of whose terminals is connected to ground potential) is applied via the other terminals to one of the comparison inputs CH0 of the comparator 55, whenever the probe is powered by a potential V3 from the power supply 22.

The voltages VI+, VI−, V2, and V3 are provided by the power supply 22 of the premises controller and they are derived from the A.C. voltage U feeding the installation 1.

This power supply 22 is preferably backed up and incorporates at least one battery (not shown) for saving installation configuration data contained in the RAM of the control circuit 18, and also enabling it to power at least the sensors from the backed-up power supply in the event of a temporary failure in the A.C. supply U provided by the mains serving the installation, while also conserving configuration data in the long term in the event of a prolonged power failure (voluntary or otherwise) of said A.C. voltage U. In this case, the power supply 22 is connected to input ports PT0, PT1, and PT2 of the control circuit 18 in order to provide information concerning its operating status.

In a variant of the premises controller 4 of the invention and in particular when using the intended microcontroller for its logic control circuit 18, there are two serial inputs RXD0 and RXD1, and two serial outputs TXD0 and TXD1, thereby enabling it to operate simultaneously with two serial links, each comprising a one-way transmit link TX or TXD and a one-way receive link RX or RXD.

It is thus possible to connect the control circuit 18 via its transmission interface 19 both to a directory terminal and also to a distant device provided with a complementary transmission interface 19', e.g. another premises controller, likewise situated at a medium distance away, e.g. within 100 meters.

The transmission interface 19 thus includes one or two transmit-receive members, depending on how the premises controller 4 is connected.

In the proposed embodiment, the transmission interfaces 15 and 19, and also the additional transmission interface 19' of an optional distant device, are each constituted by a transmit module and a receive module, with each link requiring two different transmit modules 28, 29 and two different receive modules 27, 30.

In the embodiments proposed, the transmission interface 15 of the directory terminal 5 includes a receive module 27 and a transmit module 28 which are so-called "isolating" modules designed to prevent any direct electrical continuity between the directory terminal 5 and the complementary modules 29 and 30 (which are non-isolating modules) in the premises controller 4, via the wires of the links LA and LB which interconnect them.

The isolating modules 27 and 28 of the transmission interface 15 of the directory terminal are each organized about an isolating photocoupler 65 or 66.

The light emitting diode (LED) of photocoupler 66 in isolating transmit module 28 is conventionally inserted between the transmit wire TX of the computer connector and the positive power supply terminal +VI of the regulator 26 via a non-inverting amplifier 67 so as to be activated or not activated as a function of the binary signal appearing on the transmit wire TX.

The NPN type light-receiving transistor of the photocoupler 66 feeds an amplifier circuit associating a PNP type transistor 68 and an NPN type transistor 69 in cascade between terminals EPI and EMI to which the two wires of the link LA are connected. To this end, the emitter of transistor 68, the collectors of the photo transistor of the photocoupler 66 and of the transistor 69 are connected to a potential +V2 applied by the power supply 22 of the premises controller 4 via that wire of the link LA which interconnects a pin RP of the module 30 in the premises controller to the pin EPI of the transmission interface 15 of the directory terminal 5. The emitter of the transistor 69 is likewise suitable for connection to the ground of the power supply 22 via the second wire of the link LA which connects a terminal RM of the module 30 of the premises controller to the terminal EMI of the transmission interface 15.

A resistor 70 conventionally connects the base of the transistor in the photocoupler 66 to its emitter and to the base of the transistor 68, which base is connected by a diode 71 to the terminal EMI and via a capacitor 72 to the base of transistor 69, which is conventionally connected in turn via a resistor 73 to the terminal EMI and via a capacitor 74 to the terminal EPI.

A diode 75 protects the module 28 against possible voltage surges on the link LA.

A diode 76 inserted between the terminals RM and RP of the module 30 protects this module in the same way as the diode 75 protects the module 28. The cathode of the diode 76 is connected to terminal RP of the module 30 and to the positive potential +V2 via a resistor 77 in parallel with a protective diode 78.

The anode of the diode 76 is connected to the terminal RM and to the base of an NPN type transistor 79 which receives the signals emitted by the module 28. This transistor 79 has its emitter connected to ground and has its collector connected to the positive potential V2 via a resistor 80 and serves to transmit the signals it receives to the control circuit via its port RXD0, the link RXD and two inverting amplifiers 81 and 82. A diode 83, a resistor 84, and a capacitor 85 in parallel between ground and the base of transistor 79 complete this circuit in conventional manner.

In the opposite direction, the non-isolating transmit module 29 of the premises controller loop feeds the LED of the photocoupler 65 of the transmission interface 15 in the directory terminal 5 at a rate determined by the control circuit 18 via its port TXD0, the link TXD, a non-inverting amplifier 86, and a limiting resistor 87 connected to a terminal EM of the link LB. The other terminal EP of this link LB is conventionally connected at the module 20 via a resistor 88 to the potential +V2 provided by the power supply 22. A set of five diodes 91 to 93 protects the module 29 against voltage surges.

A diode 94 is connected between terminals RPI and RMI of the isolating receive module 27 in parallel with the diode 89 connected between the terminals EP and EM of the non-isolating transmit module 29 for the same reason as mentioned above.

An NPN type transistor 95 and two resistors 96 and 97 complete the input circuit at the module 29. The collector and the emitter of transistor 95 are respectively connected to the terminal RPI and the terminal RMI, with the base of this transistor being connected firstly to a middle terminal of a voltage divider bridge constituted by resistors 96 and 97 between the terminals RPI and RMI, and secondly to the cathode of the LED of the photocoupler 65, such that said diode is connected in parallel with the resistor 96.

The NPN type transistor of photocoupler 65 feeds wire RX of the computer connector via a transistor 98 and two inverters 99 and 100 connected in series. The transistor 65 is powered between ground and the potential +V2 provided by the regulator 26 of the transmission interface 15 for the directory terminal.

The base of the transistor in the photocoupler 65 is connected via a resistor 103 to a voltage divider bridge comprising resistors 101 and 102. The common point between the three resistors 101 to 103 is connected to the base of transistor 98 as is one of the terminals of a capacitor 104 which connects said base to the common point between the resistor 101 and the emitter of the transistor of photocoupler 65.

Figure 5:
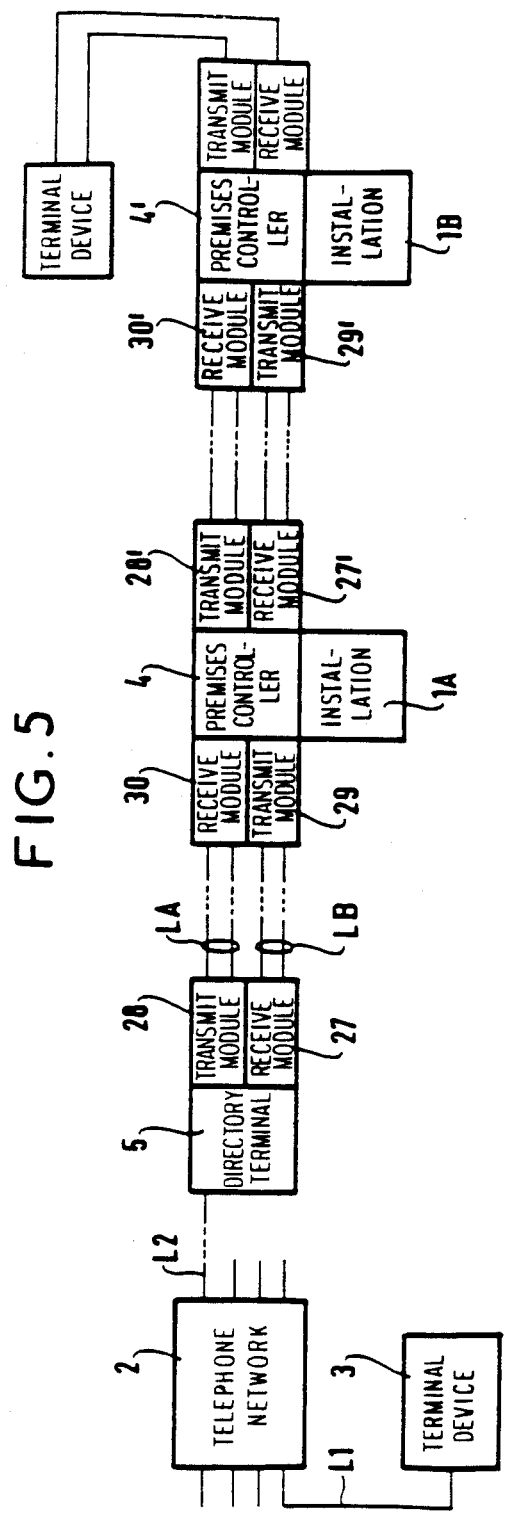
FIG. 5 is a block diagram of a remote monitoring system having on-site devices connected in series.

By associating and isolating transmit module with a non-isolating receive module and/or a non-isolating transmit module with an isolating receive module, it is possible to prevent any unwanted transmission of voltage surges between the interconnected modules. This also makes it possible to connect a chain of premises controllers to a single directory terminal, as shown in FIG. 5.

To this end, the premises controller 4 of an installation or part installation 1A is connected to a directory terminal 5 by interconnecting the isolating receive and transmit modules 27 and 28 in the transmission interface of the directory terminal respectively to the non-isolating transmit and receive modules 29 and 30 of the premises controller 4, thereby enabling data to be interchanged between the premises controller 4 and a terminal device 3 via the telephone network 2 to which the directory terminal 5 is assumed to be connected. If the premises controller 4 is also equipped with an isolating receive module 27' and an isolating transmit module 28', it may serve to connect a second premises controller 4' having non-isolating transmit and receive modules 29' and 30', with the control circuit 18 of premises controller 4 then being programmed for this purpose in conventional manner, not described in greater detail herein.

Premises controller 4' may serve dependent portions 1B of the installation 1A served by premises controller 4, in particular when such dependent portions are at a greater distance away than the maximum possible distance between units of an installation and the premises controller, while being close enough for communication via complementary modules 27-29 and 28-30.

Premises controller 4' may also serve an installation 1B which is different from the installation 1A, with the directory terminal 5 belonging, for example, to portions which are operated in common by the users of two different installations.

Given that it is possible, as described above, to connect a plurality of premises controllers in series one after the other to a common directory terminal 5, homes in a given set of homes may be served by individual premises controllers which are connected in series to a directory terminal located in premises common to the set of homes.

It is also possible to connect the premises controller 4 of an installation to a different terminal device, e.g. one specialized in remote surveillance via a pair of transmit and receive modules, either directly, or via a chain of other premises controllers, with the other terminal device being at the opposite end of the chain to the directory terminal 5.

In general, the premises controller 4 of an installation is programmed at the request of the user responsible therefor, usually by the installer or optionally by downloading under the control of a specialized distant server via the telephone network 2 and the directory terminal 5.

A call between the premises controller 4 and a distant terminal device 3 via the telephone network and the directory terminal 5 may be set up equally well from the terminal device 3, from the premises controller 4, or optionally from the telephone equipment 6 associated with or incorporated in the directory terminal 5. Such a call can be set up either by a user, or else automatically by means of a predetermined program running in the terminal device, or in the premises controller under the control of the corresponding control circuit. This implies a stage corresponding to taking a telephone off-hook, a stage during which the dial tone or busy tone is listened for, a stage during which the number corresponding to the called telephone line is dialled, and a stage during which a carrier-ready-to-receive signal is detected, which corresponding to an effective connection suitable for transmitting data to a terminal device 3 or to a directory terminal, after it has responded in a manner corresponding to the handset at the called end being taken off-hook.

Data is then interchanged between the directory terminal 5 and the terminal device 3 using a conventional procedure for directory terminals.

At the end of the call, the control circuit of the premises controller and/or a control circuit in the terminal device 3 ensure that operations corresponding to hanging up the handset of a conventional telephone are performed so as to release the telephone link that was temporarily set up through the telephone network 2.

We claim:

1. A remote monitoring system for remotely monitoring, by telephone, at least one apparatus of an installation (1), said monitoring system acting through a telephone network (2) having lines to which the installation and at least one distant terminal device (3) are connected for remote monitoring purposes, the system being characterized in that it comprises a directly terminal (5) of a type suitable for automatically detecting and dialing telephone calls (12, 13) in order to be put into communication with said at least one terminal device (3) through the telephone network, said at least one terminal device being compatible with the directory terminal (5) so as to enable them to be put into communication with each other from either end via the telephone lines (L1, L2) respectively connecting said at least one terminal device (3) and the directory terminal (5) to the telephone network, and, local to the installation, a premises controller (4) organized about a microprocessor control circuit (18) and connected firstly to units (23, 24, 25) of the apparatus to be monitored in the installation, and secondly to said directory terminal, with said directory terminal acting as an interface between said premises controller and the telephone line (L2) connecting said at least terminal device to said telephone network for communication between said apparatus and said at least distant terminal device.

2. A remote monitoring system according to claim 1, characterized in that the premises controller (4) and the directory terminal (5) are each provided with a respective transmission interface (19, 15) for their mutual interconnection so as to enable them to be located at a distance apart from each other, with the transmission interface (15) of the directory terminal being connected to the wires of a computer connector included in the directory terminal and including a transmit module (28) and a receive module (27) which amplifies signals and electrically isolates the directory terminal and the premises controller.

3. A remote monitoring system according to claim 2, characterized in that the transmission interface (15) of the directory terminal (5) is suitable for connecting said directory terminal to said premises controller, and is itself contained in an independent housing connectable to the wires of the computer connector (14) of said directory terminal.

4. A remote monitoring system according to claim 1, characterized in that said premises controller (4) includes a transmission interface (19) comprising two transmit modules (28', 29) and two receive modules (27', 30) internally connected to serial ports (TXD1, TXD0, RXD1, RXD0) of the control circuit (18) in such a manner as to enable a transmission interface (19') distant from the directory terminal (5) to be connected, with data transmitted between said distant interface and said directory terminal transmitting via the control circuit (18) of the premises controller.

5. A remote monitoring system according to claim 4, characterized in that firstly the two transmit modules (28', 29) and secondly the two receive modules (27', 30) of the premises controller are complementary, with at least one module in each complementary pair ensuring electrical isolation between the link to which it is connected (LA or LB) and the controller in which it is included.

6. A remote monitoring system according to claim 5, characterized in that it includes at least two premises controllers (4, 4) connected in series to a common directory terminal (5) via their respective transmit and receive modules.

7. A remote monitoring system according to claim 5, characterized in that the premises controller (4) is connected firstly to said directory terminal (5) and secondly to a different terminal device.

8. A remote monitoring system according to claim 1, characterized in that said premises controller (4) includes an electrical power supply (22) taking power from the A.C. mains, said power supply being of the backed-up type.

9. A remote monitoring system according to claim 1, characterized in that said premises controller (4) includes at least one portion of backed-up RAM for storing configuration data for the controller.

10. A remote monitoring system according to claim 1, characterized in that said premises controller includes at least one send interface (20) suitable for sending commands in digital form to units (23) of the installation, and at least one receive interface (21) suitable for receiving information from units (24, 25) of the installation (1), said interfaces (20, 21) being connected to ports of the control circuit (18) for control purposes.

11. A remote monitoring system according to claim 6, characterized in that the premises controllers (4, 4') connected in series in the system are connected firstly to said directory terminal (5) at one end of the series formed thereby, and secondly to a different terminal device at the other end of said series.

* * * * *